Oct. 5, 1965 R. H. STIMPSON ETAL 3,209,675
APPARATUS FOR STERILE TRANSPORTATION OF PERISHABLE LIQUIDS
Filed Feb. 17, 1960 2 Sheets-Sheet 1

INVENTORS.
Robert H. Stimpson
David W. McCalip
BY
Christy, Parmelee, Strickland
ATTORNEYS INVENTORS.
Robert H. Stimpson
David W. McCalip
BY

ATTORNEYS

United States Patent Office 3,209,675
Patented Oct. 5, 1965

3,209,675
APPARATUS FOR STERILE TRANSPORTATION OF PERISHABLE LIQUIDS
Robert H. Stimpson, Pittsburgh, and David W. McCalip, Sewickley, Pa., assignors to H. J. Heinz Company, Pittsburgh, Pa., a corporation of Pennsylvania
Filed Feb. 17, 1960, Ser. No. 9,302
3 Claims. (Cl. 99—269)

This invention is for a method of and apparatus for the bulk transportation of perishable food substances of a liquid or flowable character, particularly vegetable substances such as fruit or vegetable juice, concentrates and purees, particularly those which must be sterilized and kept in a sterile environment to prevent spoilage.

In the copending application of Morris S. Dixon, et al., Serial No. 784,173, filed December 31, 1958, there is disclosed a method for the bulk storage of liquids of the kind above referred to. Frequently it is necessary to transport liquids so stored from one place to another by rail over great distances, where the material must be kept sterile in transit. The present invention, which constitutes an improvement in the aforesaid application, is for a tank vehicle, especially a tank car, and a method of using the same in transporting in bulk, materials of this character.

The present invention has for its primary object the provision of a mobile tank, especially a railroad tank car, for the transportation of such perishable products under sterile conditions, and the method of operating the same.

According to our invention, the tank car is constructed to comply with the requirements of the Interstate Commerce Commission, and externally the tank is similar to tank cars generally, with a horizontal cylinder tank structure and a vertical dome at the top midway between the ends. While the outlet for the tank is at the bottom in the middle of the car, Interstate Commerce Commission regulations require that the discharge valve be inside the tank with an operating rod extending upwardly and accessible at the top of the dome. A feature of the present invention is the sterilization and maintenance of a sterile condition in this area after filling, in transit, and upon emptying the tank. Also before the tank can be filled, the interior of the tank and all air inside of it must be sterile, and our invention provides for sterilizing the interior of the tank and the air. Also, since the tank can be filled only to the top of the tank, leaving a space in the dome which is not filled with liquid, the present invention provides for the maintenance of inert gas at superatmospheric pressure in the dome during transit.

Our invention may be more fully understood by reference to the accompanying drawings, in which.

Figure 1:
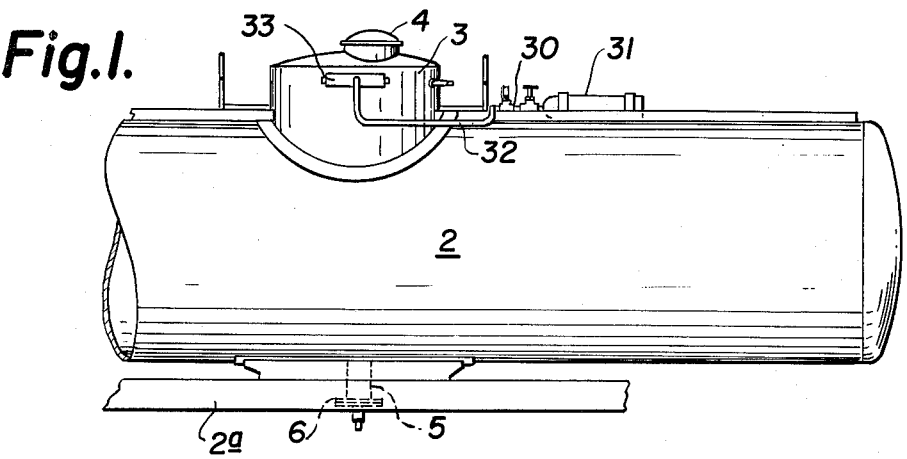
FIG. 1 is a side elevation of a tank car tank embodying our invention.
Figure 2:
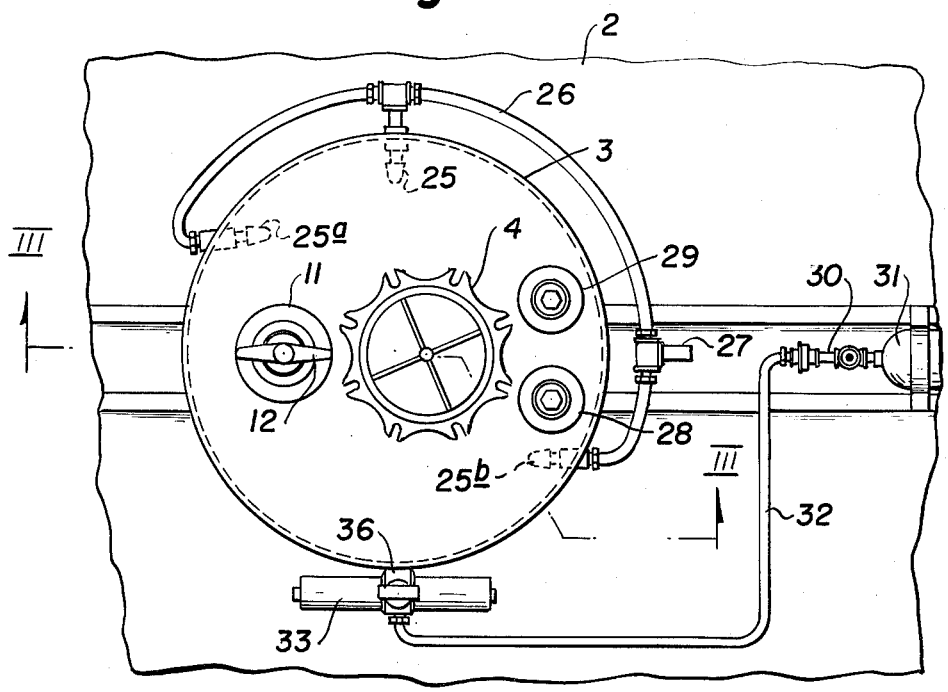
FIG. 2 is a plan view of the dome area only of the tank.
Figure 3:
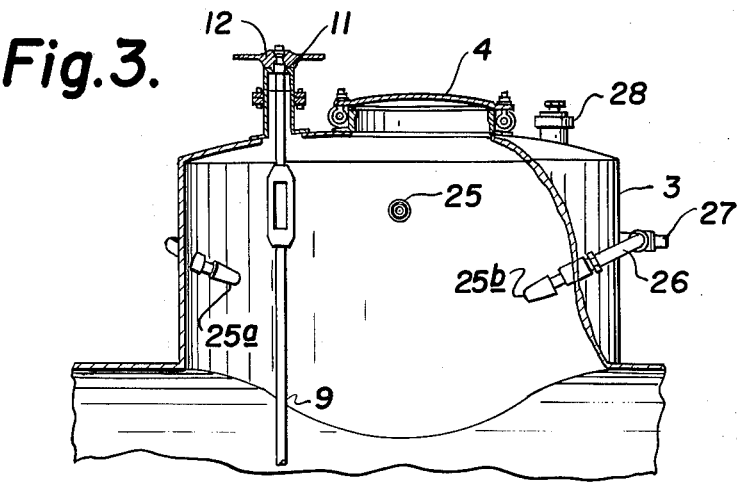
FIG. 3 is a vertical longitudinal section on a larger scale through the mid portion of the tank with the "riding flange" on the discharge sump.

Referring to the drawings, 2 designates the tank of a railroad tank car. The frame and trucks may be of any usual or preferred construction, and since this is usually an approved construction forming no part of this invention, these parts have not been shown, except for the fragmentary portion 2a in FIG. 1. The tank has a dome 3 in the top at the middle with a manhole and cover 4 thereon which may be hermetically sealed, this being also of usual construction. The tank may be of stainless steel, or of common steel with a plastic or resistant lining over the entire interior. Since tomato juice or puree and other juices or products are usually acid, the lining is resistant to those acids contained in these products.

There is a discharge sump or tubular extension or enclosure on the bottom of the tank under the dome, this extension being designated 5 with a flange 6 at its lower end. At the top of the sump 5 in the bottom of the tank is a valve seat, more or less schematically indicated at 7, and cooperating with this seat is a valve 8 of a construction common in such tank cars, and which is more or less schematically indicated. It is carried on a valve stem 9 passing through a support 10 inside the tank. The valve stem extends in the usual manner up through the dome of the car with the usual operating hand wheel 11 on the top and the safety guard 12 to prevent tampering. The valve itself is of standard construction, and I.C.C. regulations do not permit it to be located below the tank bottom, and require that it be operated from the top of the tank. The discharge sump or flanged outlet enclosure 5 is important to our invention.

When the car is in transit, full of perishable product, there is a closure plate 13 bolted against the flange 6 by bolts 14. This is termed the "riding" flange. It has a tube 15 passing centrally up through it and welded therein, the tube terminating just under the valve 8, which during transit is closed. The lower end of this tube extends below the flange 13 and has a valve 16, preferably any one of several tamper-proof valves, thereon, and terminates in a coupling 17.

Assuming the tank to be full of product and ready for shipment with the riding flange in place, a hose is attached to coupling 17 and alcohol or other non-toxic sterilizing fluid is discharged through the tube, the alcohol impinging against the lower face of the valve and valve seat, sterilizing these areas and cleaning away any trace of vegetable matter that may be adhering thereto. The alcohol collects inside the sump or well 5, preserving a sterile condition therein, and the valve 16 is closed before the hose for supplying alcohol is removed, so that tube 15 remains full of alcohol and forms a biological seal against bacteria entering through valve 17. The sump 5 of course also is substantially full of alcohol, which in transit continuously splashes about to wash against the bottom of the valve and keep it sterile.

The car travels to its destination with the sump or well full or partly full of alcohol—perhaps as much as two quarts—and the possibility of spoilage-producing organisms getting into the product or in or around the interior of the discharge spout or valve is prevented.

Figure 4:
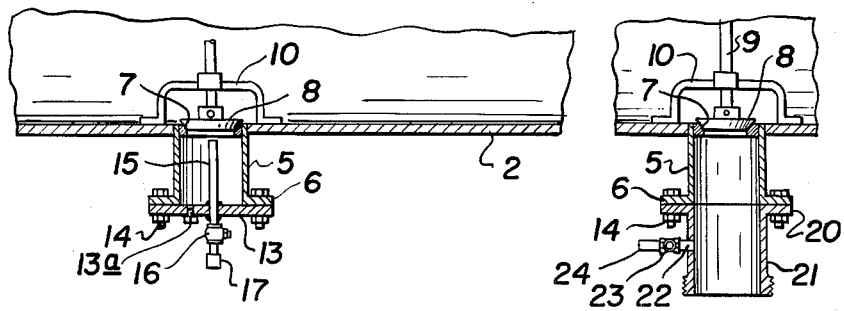
FIG. 4 is a view partly in section and partly in elevation of the discharge portion of the tank with the "charging flange" or "discharging flange" in place.
Figure 5:
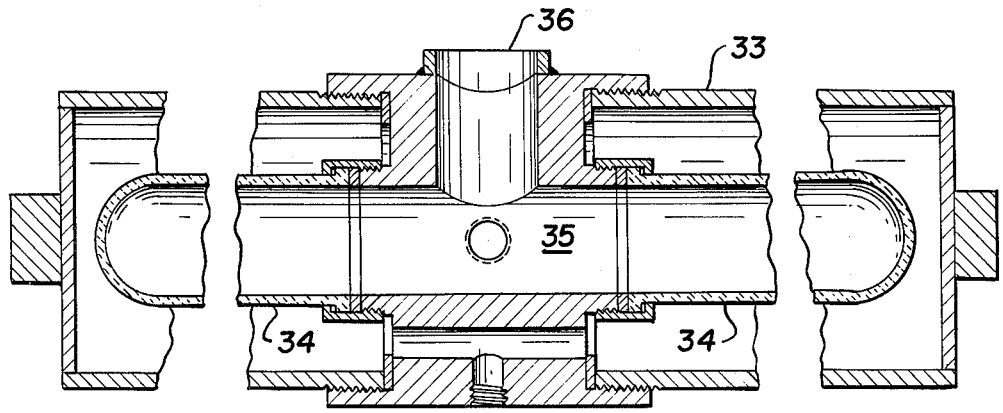
FIG. 5 is a horizontal longitudinal section through a portion only of the dome with the inert gas filter.

At destination, where the car is to be emptied, the exterior of the sump and riding flange are thoroughly hosed and washed. There is a removable plug 13a in the riding flange, and this is first opened to drain off the alcohol after which the bolts 14 are loosened and the riding flange is removed. The riding flange is immediately replaced by the discharging flange 20 (see FIG. 4), which is secured in place in the same manner by bolts 14. This flange has a dependent sanitary-type coupling 21 to which a flexible discharge hose or tube (not shown) is connected through a sanitary fitment of a type used in food processing plants. The coupling 21 has a pipe 22 entering it between its ends, this pipe having a valve 23 therein and a coupling 24 to which a steam hose (not shown) is attached. When the discharge flange is in place and a discharge hose is attached, a steam hose (not shown) is attached to coupling 24, valve 23 is opened, and live steam sterilizes the interior of the sump against organisms that may have entered after removal of the riding flange. The steam coupling 24 here shown on the discharge tube may be permanently carried on the sump 5 between the top and bottom thereof so as to travel with the car, and the interior of valve 23 would then be exposed to the alcohol in the sump and biologically sealed. This steam also flows through the discharge hose, the discharge pump to which it usually leads, and a further hose leading from the pump, so that the discharge line is completely sterile. Usually at the receiving plant, the liquid will be pumped into a bulk storage receiving tank as described in the above-mentioned Dixon, et al. application.

After a car has been emptied, it is flushed out with water, the riding flange is put back in place, and the car is returned to the point of original shipment for another load. At the loading end the riding flange is removed and the interior of the tank is again cleaned with water. Around the interior of the dome are several, preferably three, fog nozzles 25, 25a and 25b. Fog nozzle 25 is directed to project a mist across the interior of the dome, nozzle 25a is at the forward side of the dome and projects a mist toward the rear of the tank, and 25 is at the rear of the dome and projects its spray forwardly. The nozzles 25a and 25b are on opposite sides of the longitudinal center of the tank and are angled downwardly so that their respective sprays do not impinge each other, and together they can fill both ends of the tank with mist which they generate. Nozzle 25 is substantially horizontal, and the force of its spray is above the mists projected by nozzles 25a and 25b, and as hereinafter more fully pointed out, to sterilize the inside of chamber 35 and filters 34. The three nozzles are connected to a single manifold 26 that partially circles the exterior of the dome, and which has a connection 27 to which a hose may be attached for supplying peracetic acid used as a sterilizing medium.

After the interior of the car has been washed it is closed, and just before it is to be filled, a hose (not shown) is attached to the manifold and a sterilizing medium, such as peracetic acid, is sprayed into the tank through the several nozzles. The fog which is generated by these nozzles completely penetrates the interior of the tank and sterilizes the walls and the air within the tank against any organisms that might cause spoilage of the product. The peracetic acid flows out through the discharge spout 5, the valve 8 then being open. Immediately after spraying the interior with peracetic acid, a charging flange, which is similar to the discharging flange above described, is bolted to the flange 6 at the end of the discharge spout 5, and a hose is attached thereto leading to a pump for supplying the product to be shipped. When this hose is attached, the valve 8 is closed and steam is introduced through the coupling 24 and the interior of the sump and the interior of the hose is sterilized with live steam. After the hose has been sterilized, the valve 8 is opened and the product is pumped through the hose into the car through the bottom. As the level of product within the tank rises, the sterile air is forced out through a vent 28 on the top of the dome, and product is pumped into the car until the tank, except for the dome, is full. There is also a pressure relief valve 29 on the dome. When the tank is full valve 8 is closed, the charging flange is disconnected, the interior of the sump is cleaned of any product, and the riding flange is bolted into place and alcohol introduced through pipe 15.

On the top of the car between the dome and one end of the car there is secured a cradle in which is placed a cylinder of nitrogen or other inert gas, the gas being under pressure. The cylinder is clamped into position in the cradle. At the discharge end of the cylinder which is pointed toward the dome, there is secured a pressure regulator and gauge, this regulator and gauge fitment being of a well-known construction and being designated 30, while the tank is designated 31. A pipe 32 leads from the regulator to a filter unit designated generally as 33. Within the filtering unit are two horizontally-extending hollow filters 34 of ceramic, asbestos or other biological filtering medium. These extend in opposite directions from the middle of the fitting, these filters being open at their confronting ends, and they open into a gas discharge chamber 35. A passage leads from the chamber 35 to the interior of the dome of the tank car at a point 36 directly opposite the fog nozzle 25. After the tank has been filled, the valve at the end of the nitrogen cylinder is opened and nitrogen flows from the cylinder through the pressure regulator to the filter where it passes through the pores of the candles and into the dome of the car, displacing practically all of the air in the dome. After the nitrogen has been supplied for a length of time sufficient to displace all or most of the air, the vent is closed so that nitrogen under pressure is kept in the dome. The pressure of the nitrogen is regulated so that the pressure in the dome will be slightly above atmosphere, and while the filled tank is in transit, the cylinder of nitrogen continues to maintain this pressure so that if there should be any leakage, the leakage would be from the interior of the dome outwardly, preventing the ingress of any air.

In loading and shipping a car in this manner, the product which has been sterilized before it enters the tank enters a tank which has also been sterilized, and in which the air has been sterilized and a sterile condition is kept during transit by the continued supply of filtered nitrogen or other inert gas.

The procedure for emptying the tank has been described above, but as the liquid is being drained from the tank, reducing the pressure in the tank, additional nitrogen may be supplied, or the nitrogen may be disconnected and sterile air admitted through the filter.

Our invention therefore provides a method and apparatus by which liquid or semi-liquid food product which has been previously sterilized may be introduced under sterile conditions into a tank mounted on a vehicle such as a railroad car, the tank filled with product and maintained in a sterile condition during transit. The nitrogen in the top of the dome and the alcohol in the discharge well both act to prevent atmospheric air from carrying spoilage-causing organisms into the tank. The invention provides a method and apparatus by means of which the tank may be filled at one place under sterile conditions, transported to destination and there discharged, with the product being protected from spoilage-producing organisms.

While we have specifically mentioned nitrogen as the preferred inert gas, other inert gases may be used, as disclosed in the Dixon, et al. application above referred to, or sterile air may be employed. However, since air remaining in contact wtih the product over a period of time is likely to produce some discoloration, the inert gas is preferred, and nitrogen is less expensive and in more abundant supply than other inert gases. Peracetic acid has been described as a sterilizing medium, since it is effective and small amounts of it are not detrimental to the product, but other sterilizing liquids, such as grain alcohol, could be used, or the tank may be sterilized wtih steam, in which case the tank must be then filled with an inert sterile gas to avoid creating a high vacuum in the tank when the steam condenses. The term "liquid" as used herein includes high viscosity substances, as well as juice or juice concentrate, including heavy fruit or vegetable paste or puree, so long as it is of a flowable character adapted to shipment in tanks.

The tank car construction complies with the requirements of the Interstate Commerce Commission, and in transit no part of the apparatus projects below the limit established by the Interstate Commerce Commission, which requires a certain clearance between the top of the rails and the lowermost part of the tank. Tests under varying weather conditions have indicated that the product may be shipped day in and day out without deterioration in any way, and with substantial economy over the usual method of sealing the product in small cans.

It will be understood that various other changes and modifications may be made within the construction of the apparatus within the contemplation of our invention and under the scope of the following claims.

We claim:

1. A tank car for the bulk shipment of sterilized perishable products of a liquid character comprising a tank having a discharge opening in the bottom thereof, a valve in the discharging opening, an enclosure secured to the tank extending downwardly below the discharge opening, said enclosure having an opening at the bottom with a coupling flange thereabout, a closure plate removably secured to the coupling flange on the enclosure over the opening at the bottom of the enclosure, a tube passing through and sealed into the closure plate and projecting upwardly into the enclosure and terminating below but in proximity to the valve, said tube providing means for introducing sterilizing liquid into the enclosure and against the exposed area of the valve when the valve is closed, said tube having a valve therein outside the enclosure which may be opened for the introduction of liquid into the enclosure and thereafter closed, the enclosure serving to retain the sterilizing liquid therein so that it may splash about in transit, the arrangement being such that the sterilizing liquid may be introduced through the tube but is trapped in the enclosure against removal through said tube even if the valve is open, the outer end of the tube terminating in a nipple to which a hose for introducing liquid may be attached.

2. A tank for the bulk transportation of sterilized perishable products of a liquid character, said tank comprising a horizontally-elongated vessel of generally cylindrical section with a dome in the top near the middle of the tank and a hermetically sealed cover on the dome, fog nozzles in the dome for projecting a mist of sterilizing fluid into the two ends of the tank and into the interior of the dome, the tank having an outlet port in the bottom thereof, a valve within the tank having operating means accessible above the top of the tank movable to open and close said outlet port, means for maintaining after filling and during transit a sterile seal below the valve and outlet port, means for connecting the fog nozzles exteriorly of the dome to a source of sterilizing fluid under pressure, means for venting the dome, and means comprising a source of sterile gas under pressure exteriorly of the dome and piping including a pressure regulator for conducting gas from said source into the interior of the dome for maintaining a constant superatmospheric pressure of inert gas in the dome when the tank is full of product to be shipped.

3. A tank car for the bulk shipment of sterilized products of a liquid character as defined in claim 2 wherein the last-named means comprises a biological filter mounted on the exterior of the dome and having a gas discharge outlet into the dome opposite one of the fog nozzles, a container of inert gas under pressure mounted on the tank car with a pressure regulator at its outlet, and a pipe leading from the pressure regulator to the biological gas filter, one of said fog nozzles being effective to also project a fog of sterilizing fluid into said gas discharge outlet and into the filter.

References Cited by the Examiner

UNITED STATES PATENTS

| | | | |
|---|---|---|---|
| 8,071 | 2/51 | McGarry | 105—360 |
| 91,092 | 6/69 | Cullman | 99—269 X |
| 1,260,255 | 3/18 | Chivalley | 99—252 |
| 1,418,457 | 6/22 | Owen | 99—189 |
| 1,644,861 | 10/27 | Todt | 105—260 |
| 1,896,616 | 2/33 | Gillican. | |
| 2,092,925 | 9/37 | Lithgow | 21—78 X |
| 2,092,926 | 9/37 | Lithgow. | |
| 2,179,327 | 11/39 | Evans | 99—269 |
| 2,499,243 | 2/50 | Franklin | 99—155 |
| 2,513,450 | 7/50 | Carlisle | 105—30 X |
| 2,789,059 | 4/57 | Lindewald | 99—189 |
| 2,965,936 | 12/60 | Kaye | 21—78 X |
| 3,096,181 | 7/63 | Dixon et al. | 99—269 XR |

FOREIGN PATENTS

| | | |
|---|---|---|
| 108,693 | 10/39 | Australia. |
| 1,071,823 | 3/54 | France. |

ROBERT E. PULFREY, *Primary Examiner.*

T. E. LEVOW, GEORGE A. NINAS, JR., JEROME SCHNALL, *Examiners.*